United States Patent
Sano et al.

(10) Patent No.: US 6,474,406 B2
(45) Date of Patent: Nov. 5, 2002

(54) HEATER/COOLER UNIT OF AUTOMOTIVE AIR CONDITIONING SYSTEM

(75) Inventors: Masahiro Sano, Sano; Hiroaki Sasaki, Yokohama; Yukio Nakazawa, Samukawa; Naoharu Shibuya, Tokyo, all of (JP)

(73) Assignees: Calsonic Kansei Corporation, Tokyo (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/792,973

(22) Filed: Feb. 26, 2001

(65) Prior Publication Data

US 2002/0050349 A1 May 2, 2002

Related U.S. Application Data

(63) Continuation-in-part of application No. 08/724,460, filed on Oct. 1, 1996, now abandoned.

(30) Foreign Application Priority Data

Oct. 2, 1995 (JP) .............................................. 7-254901

(51) Int. Cl.[7] ................................................. F25B 29/00
(52) U.S. Cl. ........................... 165/42; 165/43; 454/156; 454/160; 454/161; 237/12.3 A; 237/12.3 B
(58) Field of Search ...................... 165/42, 43; 454/156, 454/160, 161; 237/12.3 A, 12.3 B

(56) References Cited

U.S. PATENT DOCUMENTS

| | | |
|---|---|---|
| 3,170,509 A | 2/1965 | De Rees et al. |
| 3,421,576 A | 1/1969 | Roane |
| 3,948,312 A | 4/1976 | Nisbet |
| 4,108,376 A | 8/1978 | Matsuda et al. |
| 4,125,150 A | 11/1978 | Zelger et al. |
| 4,383,642 A | 5/1983 | Sumikawa et al. |
| 4,523,633 A | 6/1985 | Furukawa et al. |
| 4,842,047 A | 6/1989 | Sakurada et al. |
| 4,892,135 A | 1/1990 | Sakurada et al. |
| 5,042,567 A | 8/1991 | Kajimoto et al. |
| 5,106,018 A | 4/1992 | Loup |
| 5,755,107 A | 5/1998 | Shirota et al. |

FOREIGN PATENT DOCUMENTS

| | | |
|---|---|---|
| DE | 3542626 | 6/1987 |
| GB | 0884918 | 12/1961 |
| GB | 1361188 | 7/1974 |
| GB | 1539902 | 2/1979 |
| JP | 57-202311 | 6/1956 |
| JP | 60-4410 | 1/1985 |
| JP | 61-193918 | 8/1986 |
| JP | 61-205504 | 9/1986 |
| JP | 64-41414 | 2/1989 |
| JP | 64-202514 | 8/1989 |
| JP | 78-204127 | 12/1989 |
| JP | 6-71221 | 10/1994 |

*Primary Examiner*—John K. Ford
(74) *Attorney, Agent, or Firm*—Foley & Lardner

(57) ABSTRACT

A heater/cooler unit of an automotive air conditioning system for use in a vehicle is disclosed. The unit includes a casing defining an air flow passage for flow of air. The casing includes an enlarged lower portion and a reduced upper portion, and an air inlet opening and an air outlet opening communicating with the air flow passage. The unit also includes an evaporator in the air flow passage. The unit also includes a heater in the air flow passage with an air flow space being formed between the heater and the evaporator. The unit also includes a ventilation opening formed in the casing. The unit also includes a pair of heat openings formed in the casing, one on each side wall above the heater. The unit also includes a pair of heat ducts. The overall lateral size of the unit can be minimized.

13 Claims, 7 Drawing Sheets

HEATER/COOLER UNIT OF AUTOMOTIVE AIR CONDITIONING SYSTEM

RELATED APPLICATIONS

The present application is a continuation-in-part application of co-pending U.S. patent application Ser. No. 08/724,460 titled "HEATER/COOLER UNIT OF AUTOMOTIVE AIR CONDITIONING SYSTEM" filed Oct. 1, 1996, now abandoned which is incorporated by reference herein.

BACKGROUND OF THE INVENTION

1. Field of the Invention

The present invention relates in general to an automotive air conditioning system, and more particularly to a heater/cooler unit of the system, which is usually mounted under an instrument panel of the vehicle. More specifically, the present invention is concerned with a heater/cooler unit which is compact in size.

2. Description of the Prior Art

In general, a heater/cooler unit of an automotive air conditioning system comprises three major parts, which are an air intake part for selectively taking in outside air and/or inside air, a cooler part for cooling the air from the air intake part and a heater part for heating the air from the cooler part. In operation, the air flowing from the air intake part is forced to make a heat exchange with the cooler and heater parts and thus conditioned. The heater/cooler unit is formed at a downstream portion thereof with a plurality of air outlet openings from which the conditioned air is led to various given areas of a passenger room through respective ducts.

Hitherto, in view of the tendency of downsizing the vehicles, various attempts have been made for reducing the size of the heater/cooler unit, one of which is shown in Japanese Utility Model First Provisional Publication 57-202311.

For clarifying the task of the present invention, a heater/cooler unit disclosed by the Publication will be outlined with reference to FIG. 7 of the accompanying drawings.

As shown in the drawing, the heater/cooler unit comprises an integral casing 1 in which a generally U-shaped air flow passage "P" is defined by curved walls. At an upstream portion of the passage "P", there is installed an electric fan "f" for taking in outside and/or inside air. An outside air inlet opening "2b" and an inside air inlet opening "2a" are exposed to the upstream portion of the passage "P" with an air intake door 9 arranged therebetween. At a portion just upstream of the lowermost portion of the U-shaped passage "P", there is installed an evaporator 3 by which the air from the electric fan "f" is cooled. As shown, a downstream portion of the U-shaped passage "P" with respect to the lowermost portion of the same is enlarged and has a heater core 6 installed therein. At a terminal end portion of the passage "P", there is defined an air mix chamber 7. Due to presence of the heater core 5, the enlarged downstream portion of the passage "P" defines two shorter air flow passages 6a and 6b, one being an air heating passage 6a including the heater core 5 and the other being a bypass passage 6b bypassing the heater core 5. As shown, these two shorter passages 6a and 6b have downstream ends merged with the air mix chamber 7. An air mix door 4 is arranged to control the rate between the amount of air directed to the passage 6a and the amount of air directed to the other passage 6b. A ventilation opening 8v and a foot space opening 8f are exposed to the air mix chamber 7. That is, in operation, conditioned air in the air mix chamber 7 is led to given areas of the passenger room through the ventilation and foot space openings 8v and 8f respectively.

Due to usage of the generally U-shaped air flow passage "P", the cooler/heater unit can be fairly reduced in size. However, as is understood from the drawing, the arrangement of placing the air flow passage "P" between the evaporator 3 and the heater core 5 has failed to obtain a satisfied compactness of the cooler/heater unit. In fact, due to such arrangement, the thickness "T" of the unit increases by a non-negligible degree.

In order to solve this drawback, a measure may be thought out in which the evaporator 3 and the heater core 5 are vertically aligned in the upstream part of the U-shaped air flow passage "P" for reduction of the thickness "T". However, this measure tends to induce another drawback wherein due to inevitable size-difference of the evaporator 3 and the heater core 5, the passage containing these devices 3 and 5 is forced to have a complicated structure. Usually, the evaporator 3 is larger than the heater core 5. As is known, providing the cooler/heater unit with such a complicated structure causes a creation of useless space or dead space around the unit upon assembly in the vehicle.

SUMMARY OF THE INVENTION

It is therefore an object of the present invention to provide a compact heater/cooler unit of an automotive air conditioning system, which is free of the above-mentioned drawbacks.

According to the present invention, there is provided a heater/cooler unit which is produced compact in size by effectively using the spaces which would be inevitably produced when the unit contains an evaporator and a heater core which are different in size.

According to a first aspect of the present invention, there is provided a heater/cooler unit of an automotive air conditioning system. The unit comprises a casing having air inlet and outlet openings which are connected through an air flow passage defined by the casing, the casing including an enlarged portion and a reduced portion by which an enlarged part and a reduced part of the air flow passage are defined respectively, the casing thus having a concave contour defined by the reduced portion thereof; an evaporator installed in the enlarged part of the air flow passage; a heater unit which is smaller in size than the evaporator, the heater unit being installed in the reduced part of the air flow passage; and at least one duct snugly extending along the concave contour of the casing, the duct having one end connected to a downstream portion of the air flow passage.

According to a second aspect of the present invention, there is provided a heater/cooler unit of an automotive air conditioning system. The unit comprises a casing including a body portion and a head portion which are integrally molded, the body portion including an enlarged lower part and a reduced upper part which are connected through a smoothly curved intermediate part, the casing thus forming at both sides of the reduced upper part concave outer surface portions thereof, the head portion defining therein an air mix chamber which is communicated with the interior of the reduced upper part; an evaporator installed in the enlarged lower part of the casing; a heater core which is smaller in size than the evaporator, the heater core being spacedly installed in the reduced upper part of the casing; an air mix door arranged between the evaporator and the heater core to control the rate between the amount of air which travels the heater core before reaching said air mix chamber and the amount of air which directly reaches the air mix chamber without traveling the heater core; and two ducts received on and extending along the concave outer surface portions of the casing respectively, each duct having one end connected to the air mix chamber.

According to a third aspect of the present invention, there is provided a heater/cooler unit of an automotive air conditioning system. The unit comprises a casing including a body portion and a head portion which are integrally molded, the body portion a center body part having a reversed T-shaped cross section and a thinner side body part attached to the center body part with a partition wall interposed therebetween, the center body part and the thinner side body part having respective upstream ends connected as well as respective downstream ends connected, the casing forming at both sides of the center body part concave outer surface portions thereof which extend along the thinner side body part, the head portion defining therein an air mix chamber which is communicated with both the downstream ends of the center body part and the thinner side body part; an evaporator installed in an enlarged lower part of the center body part of the body portion; a heater core which is smaller in size than the evaporator, the heater core being spacedly installed in a reduced upper part of the center body part; an air mix door arranged between the evaporator and the heater core to control the rate between the amount of air which travels the heater core before reaching the air mix chamber and the amount of air which directly reaches the air mix chamber without traveling the heater core; and two ducts received on and extending along the concave outer surface portions of the casing, each duct having one end connected to the air mix chamber.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
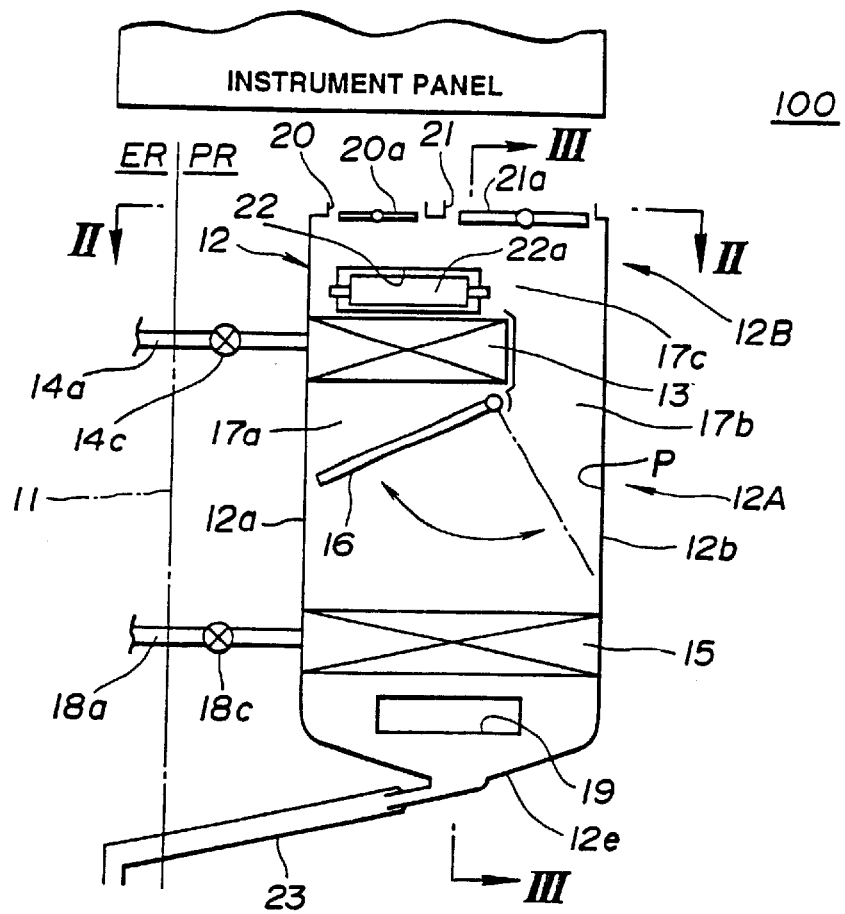
FIG. 1 is a vertically sectional view of a heater/cooler unit which is a first embodiment of the present invention.
Figure 2:
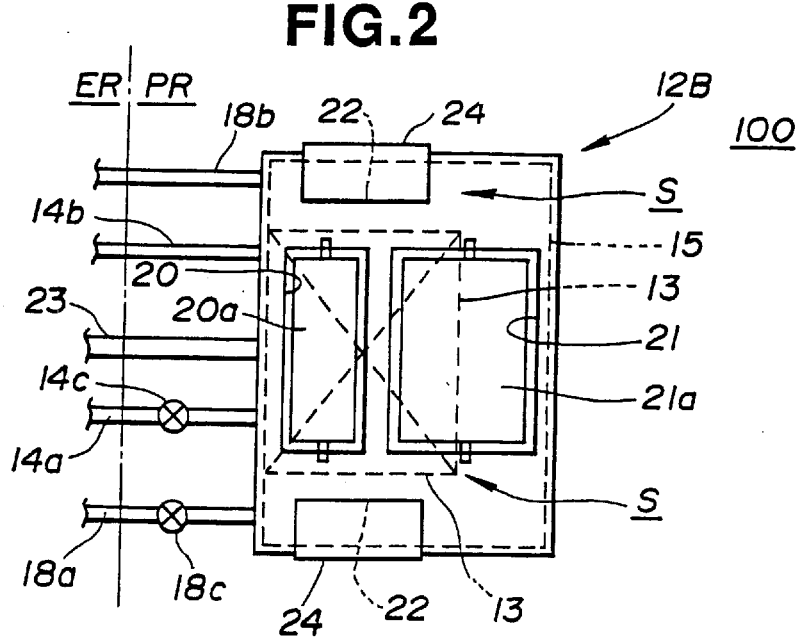
FIG. 2 is a top view of the unit taken from the direction of the line II—II of FIG. 1.
Figure 3:
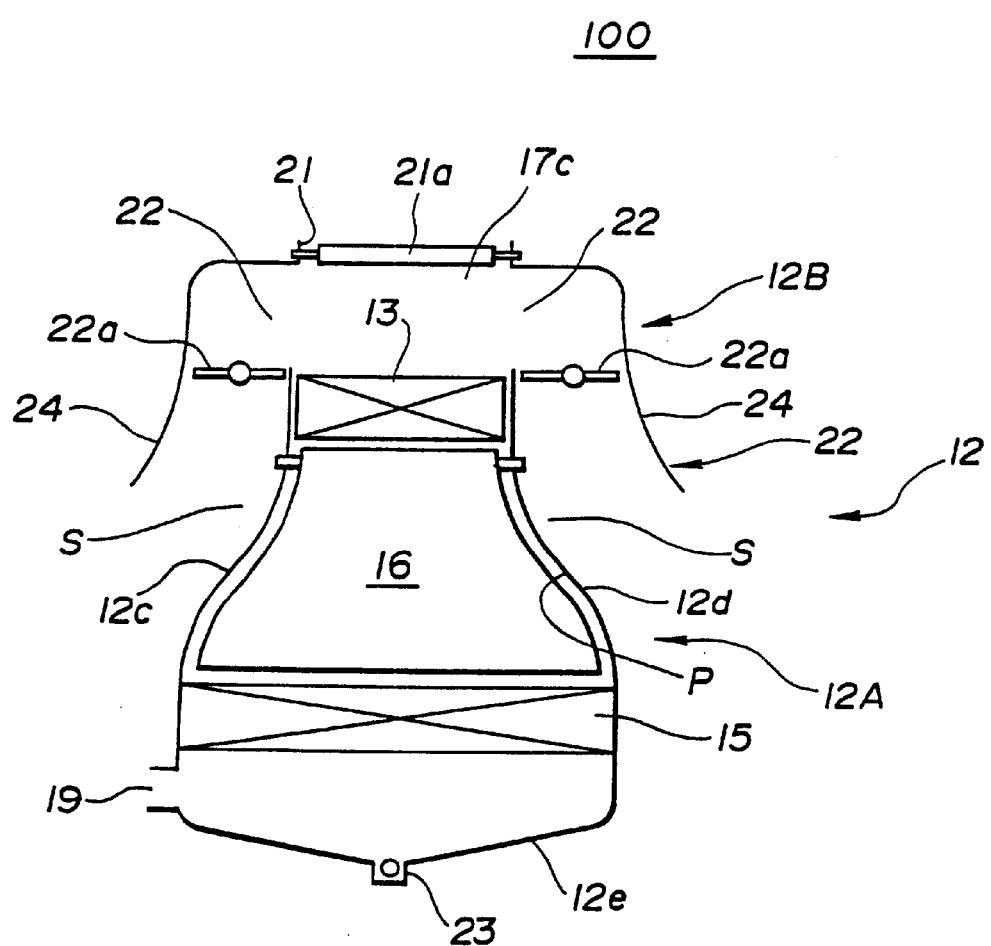
FIG. 3 is a sectional view taken along the line III—III of FIG. 1.

Referring to FIGS. 1 to 3, particularly FIG. 1, there is shown a heater/cooler unit 100 of a first embodiment of the present invention.

As will be understood from FIG. 1, the heater/cooler unit 100 is placed under an instrument panel which is positioned near a dash panel 11 by which an engine room ER and a passenger room PR are bounded.

The heater/cooler unit 100 comprises an integral casing 12 located under the instrument panel. As will become apparent as the description proceeds, the unit 100 is arranged and constructed to flow air upward in the casing 12 from a lower portion toward an upper portion.

As is understood from FIGS. 1 and 3, the casing 12 is of a molded plastic and comprises generally a body portion 12A and a head portion 12B which are integrally molded. As shown in FIG. 3, the body portion 12A has a generally trapezoidal cross section when cut vertically, while the head portion 12B has a generally reversed U-shaped cross section. As will be described in detail hereinafter, within the head portion 12B, there is defined an air mix chamber 17c from which conditioned air is led to various given portions of the passenger room.

The body portion 12A of the casing 12 comprises front and rear parallel flat walls 12a and 12b (see FIG. 1), right and left smoothly curved walls 12c and 12d (see FIG. 3) and a bottom wall 12e which are combined to constitute a bulbous body as will be understood from FIG. 3. That is, the body portion 12A has an enlarged lower part and a reduced upper part which are connected through a smoothly curved intermediate part. More specifically, the sectional area of the body portion 12A gradually reduces as the distance from the bottom increases. The reduced upper part of the body portion 12A has an apertured top.

The head portion 12B has an apertured lower portion mated with the apertured top of the reduced upper part of the body portion 12A. Thus, there is provided a fluid communication between the interior of the head portion 12B and that of the body portion 12A.

Within the body portion 12A of the casing 12, there are installed a heater core 13 and an evaporator 15 which are spaced in a vertical direction. That is, as is seen from FIGS. 1 and 3, the heater core 13 which is smaller in size is spacedly installed in the reduced upper part of the body portion 12A, while the evaporator 15 which is larger in size is snugly installed in the enlarged lower part of the body portion 12A.

As is seen from FIG. 1, behind the heater core 13 in the body portion 12A, there is defined an air flow space which serves as a bypass passage 17b as will be described hereinafter.

As is understood from FIGS. 1 and 2, to the heater core 13, there are connected both a water inlet pipe 14a and a water outlet pipe 14b for feeding the heater core 13 with an engine cooling water. The water inlet pipe 14a has a control valve 14c connected thereto. To the evaporator 15, there are connected both a refrigerant inlet pipe 18a and a refrigerant outlet pipe 18b for feeding the evaporator 15 with a refrigerant from a compressor (not shown) of the air cooling system. The refrigerant inlet pipe 18a has an expansion valve 18c connected thereto.

In the body portion 12A of the casing 12, there is defined a straight air flow passage "P" which extends upward from the lowermost part of the body portion 12A to the uppermost part of the same through the evaporator 15.

Due to presence of the heater core 13 in the passage "P", there are defined at the upper part of the body portion 12A two shorter air flow passages 17a and 17b, one being an air heating passage 17a including the heater core 13 and the other being a bypass passage 17b bypassing the heater core 13. These two shorter air flow passages 17a and 17b have downstream ends merged with the air mix chamber 17c defined in the head portion 12B of the casing 12.

Between the evaporator 15 and the heater core 13, there is pivotally arranged an air mix door 16 which controls the rate between the amount of air directed to the air heating passage 17a and that directed to the bypass passage 17b. As will be seen from FIG. 3, the air mix door 16 is shaped like a spatula for matching with the interior shape of the smoothly curved intermediate part of the body portion 12A.

The lowermost part of the body portion 12A is formed with an air inlet opening 19 through which air from a known air intake unit (not shown) is introduced into the casing 12. The air intake unit may comprise a case which has an outside air inlet opening, an inside air inlet opening and an air outlet opening, an air intake door which controls the rate of open degree between the outside air inlet opening and the inside air inlet opening, and an electric fan which drives air in the case toward the air inlet opening 19 of the heater/cooler unit 12 through the air outlet opening.

Thus, under operation of the electric fan of the air intake unit, air is forced to flow from the air intake unit into the body portion 12A of the casing 12 through the air inlet opening 19. The air thus led into the casing 12 is forced to travel upward through the evaporator 15 and one or both of the two shorter air flow passages 17a and 17b toward the air mix chamber 17c of the head portion 12B.

Designated by numeral 23 (see FIGS. 1 and 3) is a drain pipe which extends from the lowermost part of the casing 12 to the outside. That is, condensed water dropped from the evaporator 15 is discharged to the outside through the drain pipe 23.

As will be understood from FIGS. 1 and 2, the head portion 12B is formed at an upper wall thereof with both a defroster opening 20 and a ventilation opening 21. The defroster opening 20 is led through ducts (not shown) to defroster air blowing openings (not shown) directed to an inner surface of a windshield (not shown), and the ventilation opening 21 is led through ducts (not shown) to ventilation air blowing openings (not shown) directed to an upper portion of the passenger room. The defroster opening 20 and the ventilation opening 21 are provided with flow control doors 20a and 21a respectively.

As is best seen from FIG. 3, the head portion 12B is formed at opposed side portions thereof with respective foot space openings 22 which are led through respective ducts 24 to foot space air blowing openings (not shown) directed to a lower portion of the passenger room. Each duct 24 is provided near the foot space opening 22 with a flow control door 22a.

It is to be noted that the ducts 24 (see FIG. 3) extend downward along concave contours defined by the right and left curved side walls 12c and 12d of the body portion 12A of the casing 12. That is, in the first embodiment 100 of the invention, spaces "S" which are inevitably provided by the body portion 12A of the casing 12 are effectively used for snugly receiving the ducts 24. In other words, the spaces "S" inevitably produced around the casing 12 when the latter contains therein the evaporator 15 and the heater core 13 which are different in size are effectively used for downsizing the heater/cooler unit 100. Thus, the heater/cooler unit 100 of the first embodiment can be produced compact in size.

In the following, various modes provided by the heater/cooler unit 100 will be described with reference to the drawings, particularly FIG. 1.

Ventilation Mode

In this mode, the flow control door 21a fully opens the ventilation opening 21 and the other flow control doors 20a and 22a shut off their corresponding openings 20 and 22. The air mix door 16 assumes an intermediate position wherein both the air heating passage 17a and the bypass passage 17b are partially opened. Thus, in this mode, air from the air intake unit (not shown) is led into the casing 12 through the air inlet opening 19 and forced to pass through the evaporator 15. The air thus cooled by the evaporator 15 is branched into two air flows by the air mix door 16, one being directed to the air heating passage 17a and the other being directed to the bypass passage 17b. The air thus heated when traveling through the air heating passage 17a and the cooled air thus not heated when traveling through the bypass passage 17b are mixed in the air mix chamber 17c and thus conditioned in temperature. Through the opened ventilation opening 21, the conditioned air in the air mix chamber 17c is led to the ventilation air blowing openings and blown to an upper portion of the passenger room.

Foot Area Warming Mode

In this mode, the flow control doors 22a fully open the foot space openings 22 and the other flow control doors 20a and 21a shut off their corresponding openings 20 and 21. The air mix door 16 assumes an intermediate position. However, in this mode, the air mix door 16 provides a larger opening for the air heating passage 17a as compared with that for the bypass passage 17b. Thus, the air collected in the air mix chamber 17c has a temperature higher than that in case of the above-mentioned VENTILATION MODE. Thus, through the opened foot space openings 22, warmed air is led to the foot space air blowing openings and blown therefrom to a lower portion of the passenger room. Thus, under this mode, the passengers can feel warmed air around their feet. In fact, the effect of keeping the feet warm is improved due to the downward flow of the warmed air in the vertically extending ducts 24. Due to the flow straightening effect possessed by the ducts 24, the warmed air can be evenly distributed to the foot space area in the passenger room. Because each duct 24 has an upper or upstream portion positioned just beside the heater core 13, the warmed air passing through the duct 24 is prevented from suffering a temperature drop. Since there is no need of providing separate lower ducts connected to the ducts 24, a certain space saving is obtained in the vehicle by a degree corresponding to the size of the lower ducts.

Windshield Defrosting Mode

In this mode, the flow control door 20a fully opens the defroster opening 20 and the other flow control doors 21a and 22a shut off their corresponding openings 21 and 22. The air mix door 16 assumes an intermediate position to provide the air mix chamber 17c with conditioned air. Through the opened defroster opening 20, the conditioned air in the air mix chamber 17c is led to the defroster air blowing openings and blown to the inner surface of the windshield to defrost the same.

As is described hereinabove, in the first embodiment, the spaces "S" which are inevitably provided by the casing 12 are effectively used for snugly receiving the ducts 24, which makes the heater/cooler unit 100 compact in size.

Figure 4:
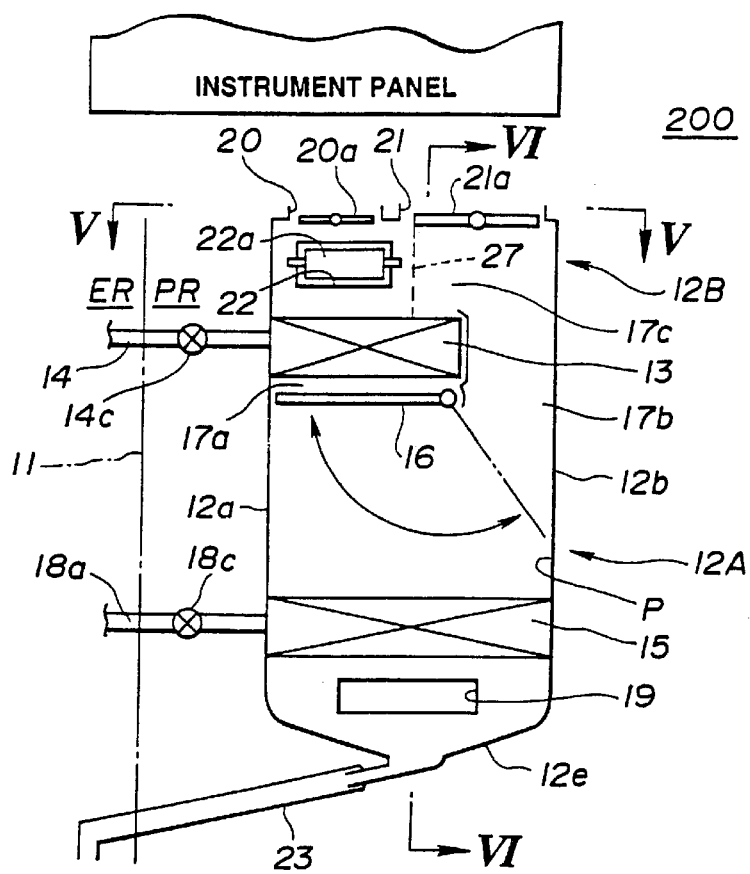
FIG. 4 is a vertically sectional view of a heater/cooler unit which is a second embodiment of the present invention.
Figure 5:
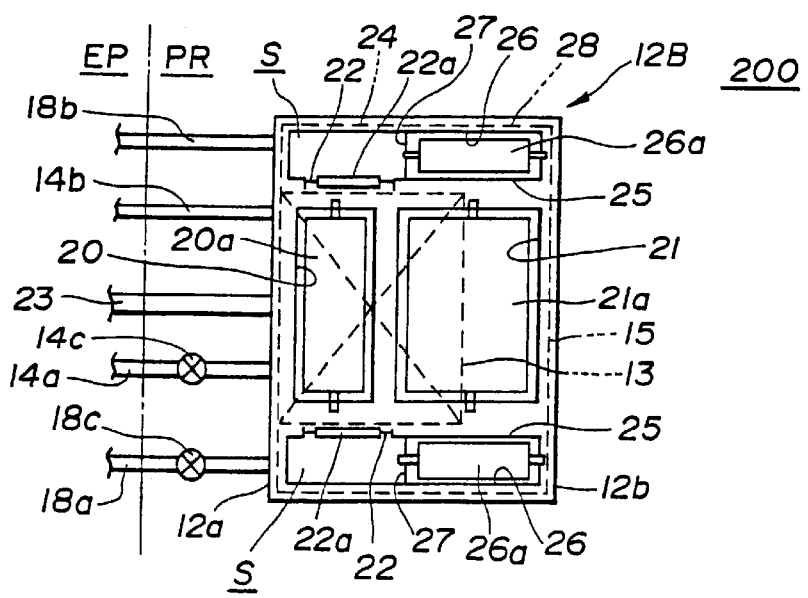
FIG. 5 is a top view of the unit of the second embodiment taken from the direction of the line V—V of FIG. 4.
Figure 6:
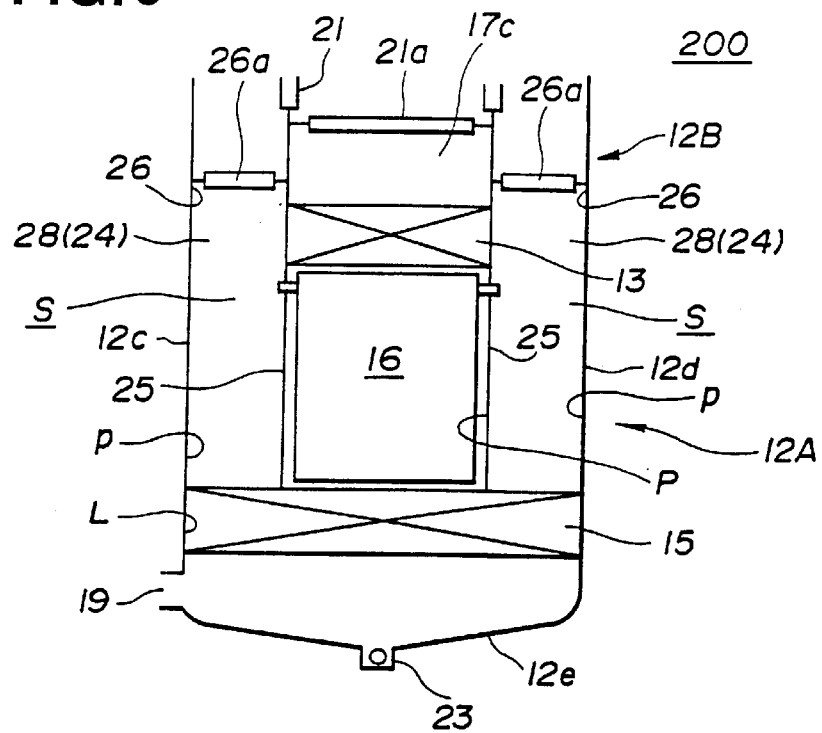
FIG. 6 is a sectional view taken along the line VI—VI of FIG. 4.
Figure 7:
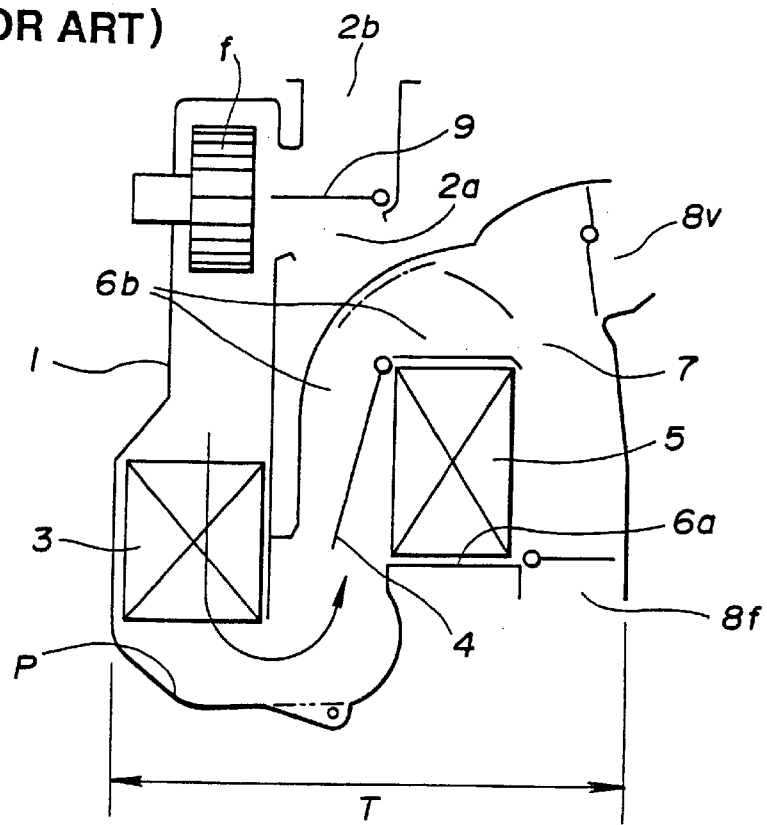
FIG. 7 is a schematically illustrated vertically sectional view of a conventional heater/cooler unit.

Referring to FIGS. 4 to 6, particularly FIG. 4, there is shown a heater/cooler unit 200 of a second embodiment of the present invention.

The heater/cooler unit 200 comprises an integral casing 12 located under the instrument panel. Similar to the above-mentioned first embodiment, the unit 200 is arranged and constructed to flow air upward in the casing 12 from a lower portion toward an upper portion.

As is understood from FIGS. 4 and 6, the casing 12 is of a molded plastic and comprises generally a body portion 12A and a head portion 12B which are integrally molded. As shown, each of the body portion 12A and the head portion 12B has a rectangular cross section. As will be described in detail hereinafter, within the head portion 12B, there is defined an air mix chamber 17c from which conditioned air is led to various given portions of a passenger room.

The body portion 12A of the casing 12 comprises front and rear parallel flat walls 12a and 12b (see FIG. 4), right and left parallel flat walls 12c and 12d (see FIG. 6) and a bottom wall 12e which are combined to constitute a rectangular parallelepiped hollow structure.

As will be seen from the drawings, particularly from FIGS. 5 and 6, within the body portion 12A, there are installed two spaced partition walls 25 which extend vertically. Each partition wall 25 has a lower end spaced from the bottom wall 12e thereby providing a larger rectangular parallelepiped space "L" at the lower part of the body portion 12A. Within the larger space "L", there is snugly received an evaporator 15 which is larger in size.

Due to presence of the partition walls 25 in the body portion 12A, there is defined therebetween a main air flow passage "P". Within the main air flow passage "P", there is spacedly received a heater core 13 which is smaller in size. Furthermore, due to presence of the partition walls 25, there are defined at both sides of the main air flow passage "P" two vertically extending spaces "p" each having a rectangular cross section. As is seen from FIG. 5, each space "p" has a vertically extending partition wall 27 by which the space "p" is divided into two air flow passages 24 and 28, one being a duct 24 for an after-mentioned foot space opening 22, and the other being a duct 28 for an after-mentioned fresh ventilation opening 26.

It is to be noted that the duct 24 for the foot space opening 22 has a closed bottom by which a fluid communication between the duct 24 and the larger space "L" is blocked, while, the duct 28 for the fresh ventilation opening 26 has an open bottom by which a fluid communication between the duct 28 and the larger space "L" is provided.

The head portion 12B has an apertured lower portion which is mounted on the body portion 12A in such a manner as to provide a fluid communication between the interior of the head portion 12B and that of the body portion 12A.

As is seen from FIG. 4, behind the heater core 13 in main air flow passage "P", there is defined an air flow space which serves as a bypass passage 17b as will be described in detail hereinafter.

As is understood from FIGS. 4 and 5, to the heater core 13, there are connected both a water inlet pipe 14a and a water outlet pipe 14b for feeding the heater core 13 with an engine cooling water. The water inlet pipe 14a has a control valve 14c connected thereto. To the evaporator 15, there are connected both a refrigerant inlet pipe 18a and a refrigerant outlet pipe 18b for feeding the evaporator 15 with a refrigerant from a compressor (not shown). The refrigerant inlet pipe 18a has an expansion valve 18c connected thereto.

Due to presence of the heater core 13, there are defined at the upper part of the main air flow passage "P" two shorter air flow passages 17a and 17b, one being an air heating passage 17a including the heater core 13 and the other being a bypass passage 17b bypassing the heater core 13. These two shorter air flow passages 17a and 17b have downstream ends merged with the air mix chamber 17c defined in the head portion 12B of the casing 12.

It is to be noted that the above-mentioned ducts 28 (for the fresh ventilation openings 26) have downstream (or upper) ends connected to the air mix chamber 17c through the fresh ventilation openings 26 which are formed in a bottom wall of the head portion 12B. Each fresh ventilation opening 26 is provided with a flow control door 26a.

In the main air flow passage "P" at a position upstream of the heater core 13, there is pivotally arranged an air mix door 16 which controls the rate between the amount of air directed to the air heating passage 17a and that directed to the bypass passage 17b. As will be seen from FIG. 6, the air mix door 16 is rectangular in shape.

The lowermost part of the body portion 12A is formed with an air inlet opening 19 through which air from a known air intake unit (not shown) is introduced into the casing 12.

Thus, in operation, air led into the lowermost part of the body portion 12A through the air inlet opening 19 is forced to travel upward toward the air mix chamber 17c of the head portion 12B by taking three air flow passages independently, which are the main air flow passage "P" and the two fresh ventilation ducts 28.

More specifically, air directed toward the main air flow passage "P" is forced to travel through the evaporator 15 and one or both of the two shorter air flow passages 17a and 17b before reaching the air mix chamber 17c, while air directed toward the fresh ventilation ducts 28 is forced to travel through only the evaporator 15 before reaching the air mix chamber 17c.

Designated by numeral 23 is a drain pipe for discharging condensed water, which is dropped from the evaporator 15, to the outside of the casing 12.

As will be understood from FIGS. 4 and 5, the head portion 12B is formed at an upper wall thereof with a defroster opening 20 and a ventilation opening 21. Each opening 20 or 21 is provided with a flow control door 20a and 21a. As is described in the section of the first embodiment 100, the defroster opening 20 is led through ducts (not shown) to defroster air blowing openings (not shown) directed to an inner surface of a windshield (not shown), and the ventilation opening 21 is led through ducts (not shown) to ventilation air blowing openings (not shown) directed to an upper portion of the passenger room.

As will be understood from FIG. 5, the head portion 12B is formed at opposed side portions thereof with respective foot space openings 22 to which upper ends of the above-mentioned ducts 24 are integrally connected respectively. The ducts 24 are led to foot space air blowing openings (not shown) directed to a lower portion of the passenger room. Each duct 24 is provided near the foot space opening 22 with a flow control door 22a.

It is to be noted that all the ducts 24 (see FIG. 6) for the foot space air blowing openings and all the ducts 28 for the fresh ventilation openings 26 extend snugly along the main air flow passage "P" which is shaped slim. More specifically, the ducts 24 extend downward along the main air flow passage "P", while the ducts 28 extend upward along the main air flow passage "P". That is, in the second embodiment 200, spaces "S" which are inevitably produced around the casing 12 when the latter contains therein the evaporator 15 and the heater core 13 which are different in size are effectively used for forming the ducts 24 and 28. Thus, the heater/cooler unit 200 of the second embodiment can be produced compact in size.

In the following, various modes provided by the heater/cooler unit 200 will be described with reference to the drawings, particularly FIG. 4.

Ventilation Mode

In this mode, the flow control door 21a fully opens the ventilation opening 21 and the flow control doors 20a and 22a shut off their corresponding openings 20 and 22. The air mix door 16 assumes an intermediate position to provide suitably conditioned air in the air mix chamber 17c. Through the opened ventilation opening 21, the conditioned air is led to the ventilation air blowing openings and blown to an upper portion of the passenger room. When the flow control doors 26a open the fresh ventilation openings 26, air cooled by the evaporator 15 is directly led to the air mix chamber 17c through the ducts 28. Thus, in this case, much cooled air is led to the passenger room through the ventilation air blowing openings.

Foot Area Warming Mode

In this mode, the flow control doors 22a fully open the foot space openings 22 and the other flow control doors 20a and 21a shut off their corresponding openings 20 and 21. Furthermore, the flow control doors 26a shut off the fresh ventilation openings 26. The air mix door 16 assumes a position to provide a larger opening for the air heating passage 17a as compared with that for the bypass passage 17b. Thus, through the opened foot space openings 22, warmed air is led to the foot space air blowing openings and blown therefrom to a lower portion of the passenger room.

Windshield Defrosting Mode

In this mode, the flow control door 20a fully opens the defroster opening 20 and the other controls doors 21a, 22a and 26a shut off their corresponding openings 21, 22 and 26. The air mix door 16 assumes an intermediate position to provide the air mix chamber 17a with conditioned air. Through the opened defroster opening 20, the conditioned air in the air mix chamber 17c is led to the defroster air blowing openings and blown to the inner surface of the windshield to defrost the same.

As is described hereinabove, in the second embodiment, the spaces "S" which are inevitably provided by the casing 12 are effectively used for compactly forming the ducts 24 and 28, which makes the heater/cooler unit 200 compact in size.

Figure 8:
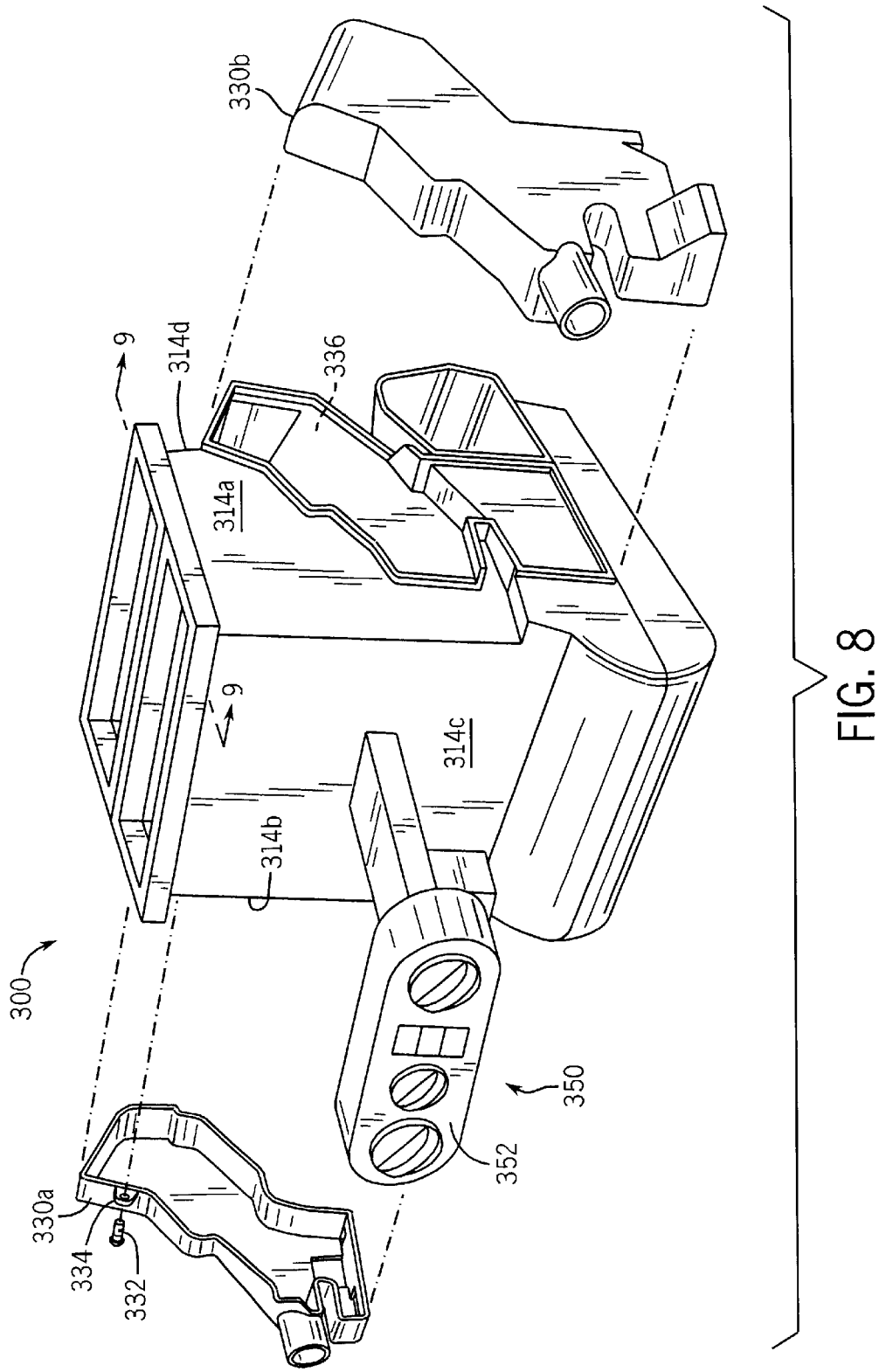
FIG. 8 is an exploded perspective view of a heater/cooler unit according to an alternative embodiment.
Figure 9:
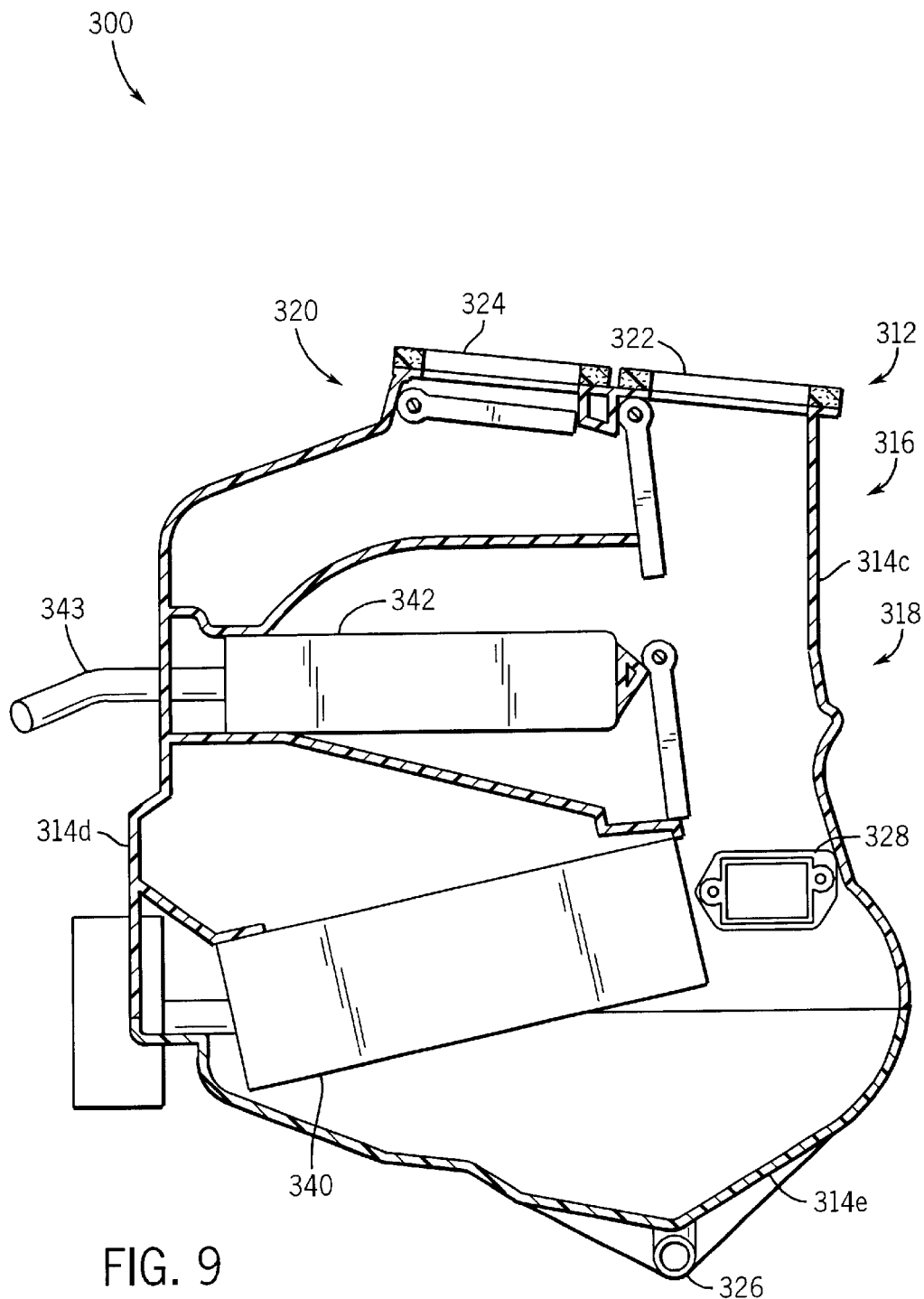
FIG. 9 is a cross-sectional view of the heater/cooler unit shown in FIG. 8 along line 9—9 of FIG. 8.
Figure 10:
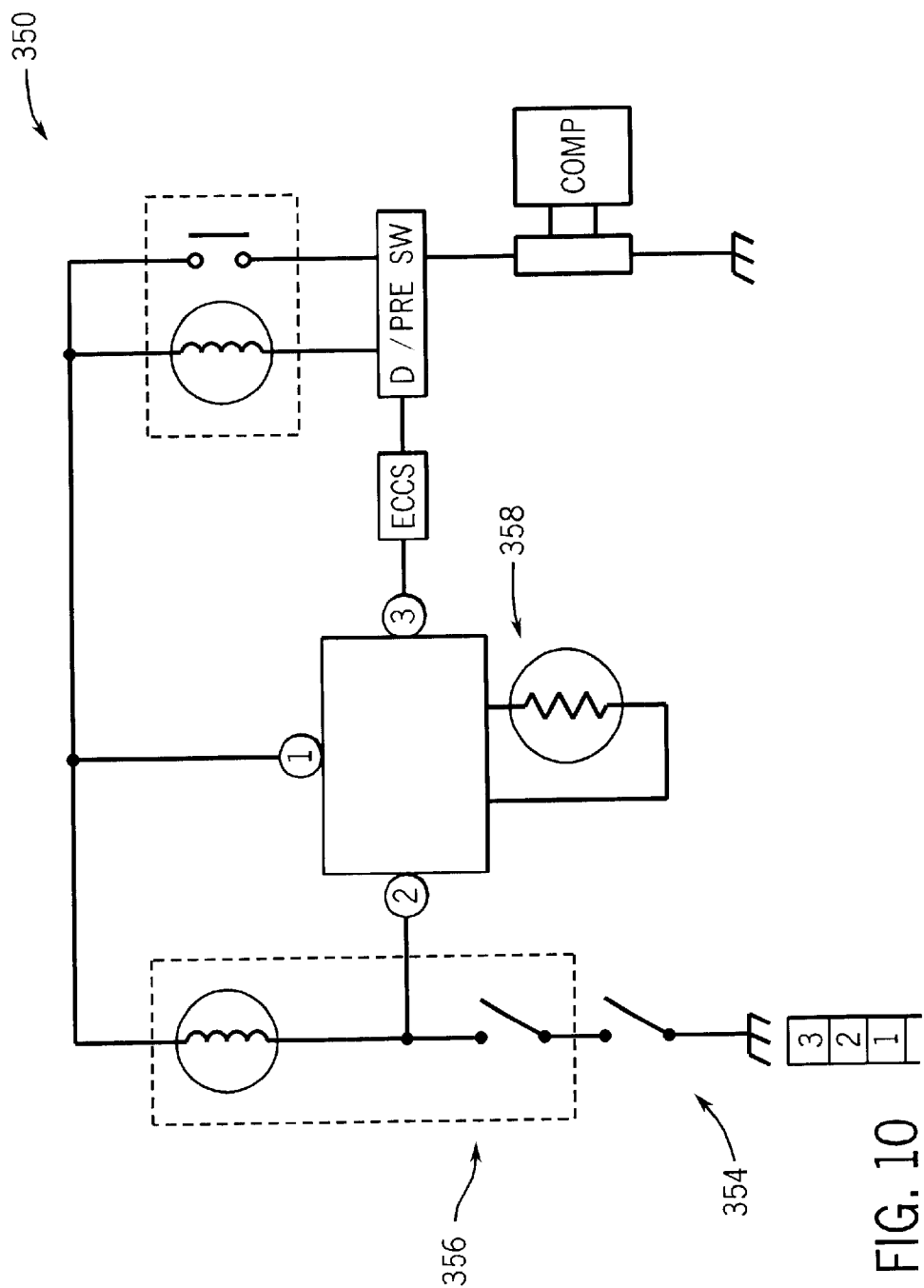
FIG. 10 is an electrical block diagram of a control mechanism for the heater/cooler unit shown in FIG. 8.

Referring to FIGS. 8 through 10, an air conditioning system (shown as a heater/cooler unit 300) is shown according to an alternative embodiment. Unit 300 includes a casing 312 (which may be "integral") formed from side walls 314a and 314b, a front wall 314c, a rear wall 314d and a base wall 314e. Casing 312 includes a head portion 316 and a body portion 318. Body portion 318 includes an enlarged lower part (shown as a "bulb" or base 320). Head portion 316 includes a reduced upper part 320. An outlet or ventilator (shown as a ventilation opening 322 and a defroster opening 324) extends from reduced upper part 320, and a drain (shown as a pipe 326) extends from base 320. An intake (shown as an air intake unit 328) is provided to selectively uptake outside (e.g. atmospheric) and/or inside air. A cavity or reservoir (shown as a duct 330a and a duct 330b), which may provide a "dead space," is shown mounted by a fastener (shown as a threaded screw 332) to each of side walls 314a and 314b, respectively. A mounting tab 334 of ducts 330a and 330b provides a mounting interface for attachment of ducts 330a and 330b to casing 312 (see FIG. 18). Ducts 330a and 330b each have a generally "L"-shaped configuration having curved contours and each provide a chamber or air passage 336 for a fluid such as water. According to a particularly preferred embodiment, the duct is molded plastic.

Referring further to FIGS. 8 and 9, a cooler or condenser (shown as an evaporator 340 in phantom lines and which may include a compressor) is provided within casing 312 for cooling air. A heater (shown as a core 342) for heating air from evaporator 340 is shown in phantom lines inside casing 312. According to a preferred embodiment, the heater may have a width and a length smaller than those of the evaporator, and the heater may have a size smaller than the reduced upper portion. According to another alternative embodiment, the overall lateral size of the unit can be minimized in the upper portion to be not significantly larger than the outer contour of the enlarged lower portion. According to another alternative embodiment, the ducts terminate near (e.g. above) the evaporator. An inlet 343 is fluidly connected to core 342 for providing a fluid (e.g. water) to cool core 342. The ducts include a passage long enough to provide an air "flow straightening effect" sufficient to direct the heated air into a foot region of the passenger compartment of a vehicle.

A control mechanism 350 providing a user interface 352, which may be part of an instrument panel of a vehicle, is shown electrically coupled to unit 300. Mechanism 350 may provide a selector (e.g. air conditioning, fan, heat, etc.) for regulating temperature and air flow in a passenger compartment of a vehicle. Referring to FIG. 10, control mechanism 350 is shown including a fan switch 354 for a fan selector, an air conditioning switch 356 for an air conditioning selector and a thermostat 358.

What is claimed is:

1. A heater/cooler unit of an automotive air conditioning system for use in a vehicle having a firewall separating a forward engine compartment from a passenger compartment, the heater/cooler unit comprising:

a casing having a front wall adapted to face the firewall, a rear wall adapted to face the passenger compartment, and opposing side walls, the casing defining an air flow passage for flow of air upwardly, the casing having an enlarged lower portion and a reduced upper portion, the casing further having at least one air inlet opening and at least one air outlet opening communicating with the air flow passage, the reduced upper portion formed at each side wall of the casing forming a first opposing pair of outer contours, the enlarged lower portion formed at each side wall of the casing forming a second opposing pair of outer contours, wherein the first pair of outer contours are laterally depressed with respect to the second pair of outer contours of the side walls, whereby a dead space is formed on each side laterally between the depressed first outer contour and a vertical extension of the second outer contour of the enlarged lower portion;

an evaporator positioned in the air flow passage at the enlarged lower portion of the casing;

a heater, having a width and a length smaller than those of the evaporator, positioned in the air flow passage at the reduced upper portion of the casing, with an air flow space being formed between the heater and the evaporator, the heater being smaller than the reduced upper portion and positioned adjacent to the front wall so that an air flow space is formed between the heater and the rear wall of the casing;

a ventilation opening formed in the casing, downstream of the air flow space;

the at least one air outlet opening including a pair of heat openings formed in the casing, one on each side wall above the heater; and a pair of heat ducts, one communicating with each of the heat openings and lying adjacent to and following, over the at least the major part of its length, the depressed outer contours formed at the side walls of the casing such that a substantial portion of the cross-section of the heat ducts is coextensive with the dead space formed on each side, each of the heat ducts extending toward the enlarged lower portion of the casing and, in the distance between the heater and evaporator, having a laterally outer surface that does not extend substantially laterally beyond the outer contour of the enlarged lower portion, whereby the overall lateral size of the heater/cooler unit can be minimized in the upper portion to be not significantly larger than the outer contour of the enlarged lower portion.

2. A heater/cooler unit as defined by claim 1, wherein each of the heat ducts terminates at a point that is not substantially below the evaporator located in the enlarged lower portion.

3. A heater/cooler unit as defined by claim 2, wherein the heater and the evaporator are spaced apart vertically by a distance that is a substantial portion of the height of the casing.

4. A heater/cooler unit as defined by claim 3, wherein each of said heat ducts is long enough to provide a flow straightening effect of heated air passing therethrough sufficient to direct the heated air into a foot region of the passenger compartment.

5. A heater/cooler unit as defined by claim 1, wherein each of the heat ducts is defined in part by the outside surface of the casing side walls.

6. A heater/cooler unit as defined by claim 2, wherein each of the heat ducts terminates at a point above the evaporator located in the enlarged lower portion.

7. A heater/cooler unit as defined by claim 1, wherein each of said pair of heat openings is located directly above and adjacent to the downstream side of the heater.

8. A heater/cooler unit as defined by claim 4, wherein each of said heat ducts opens directly toward a foot region of the passenger compartment, without any separate lower ducts connected to said heat ducts.

9. A heater/cooler unit as defined by claim 3, further comprising a pivotally mounted air mix flap in said air flow space located between the heater and the evaporator.

10. A heater/cooler unit as defined by claim 2, wherein each of the heat ducts terminates at the evaporator located in the enlarged lower portion, and the heat ducts do not extend laterally beyond the enlarged portion.

11. A heater/cooler unit of an automotive air conditioning system, comprising:

a casing including a body portion and a head portion, which are integrally molded, the body portion including an enlarged lower part and a reduced upper part that are connected through a smoothly curved intermediate part, the casing forming at both sides of the reduced upper part, concave outer surface portions thereof, the head portion defining therein an air mix chamber that communicates with an interior of the reduced upper part;

an evaporator positioned in the enlarged lower part of the casing;

a heater core smaller in size than the evaporator positioned in the reduced upper part of the casing;

an air mix door arranged between the evaporator and the heater core to control the amount of air traveling through the heater core before reaching the air mix chamber and the amount of air directly reaching the air mix chamber without traveling through the heater core; and two ducts received on and extending along the concave outer surface portions of the casing respectively, each duct having one end communicating with the air mix chamber, wherein the air mix door matches the shape of the interior of the smoothly curved intermediate part of the casing.

12. A heater/cooler unit as claimed in claim 11, wherein each duct is provided, at an upstream portion thereof, with a flow door control.

13. A heater/cooler unit as claimed in claim 11, wherein each duct is adapted to extend to a lower portion of a passenger room of an associated motor vehicle.

* * * * *